May 2, 1967 C. H. DRADER 3,317,075
CARRIER FOR MILK CARTONS

Filed May 3, 1965 2 Sheets-Sheet 1

INVENTOR
CLARENCE H. DRADER

BY-

ATTORNEY

May 2, 1967  C. H. DRADER  3,317,075
CARRIER FOR MILK CARTONS
Filed May 3, 1965  2 Sheets-Sheet 2
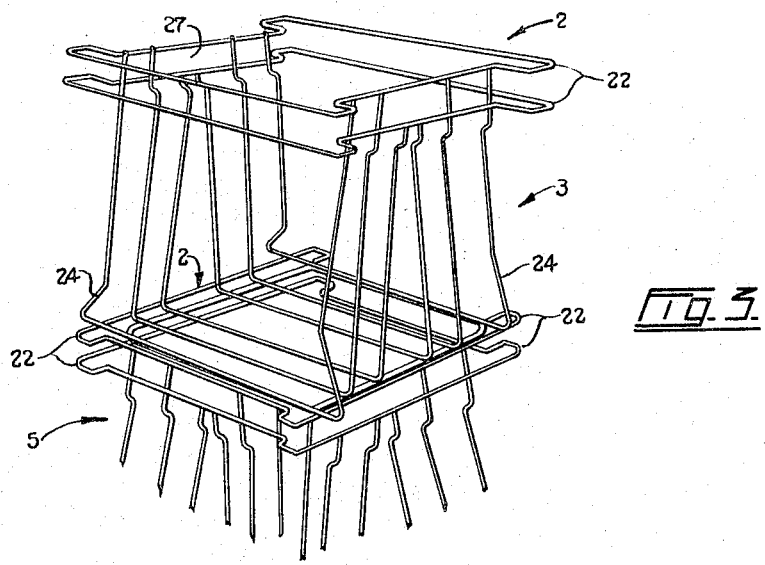
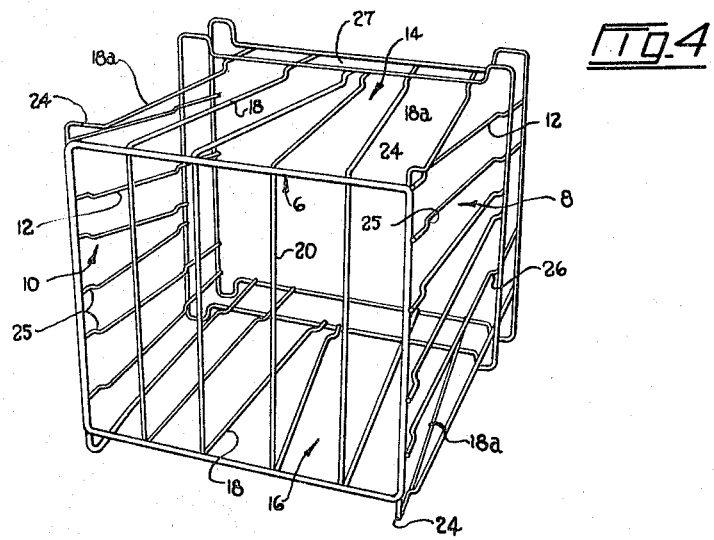
INVENTOR
CLARENCE H. DRADER
BY
ATTORNEY

United States Patent Office 3,317,075
Patented May 2, 1967

3,317,075
CARRIER FOR MILK CARTONS
Clarence H. Drader, R.R. 2, South Edmonton, Alberta, Canada
Filed May 3, 1965, Ser. No. 452,665
3 Claims. (Cl. 220—19)

This invention relates generally to carrying devices and particularly to a carrying basket that may be nested or stacked as desired.

Nesting carrier baskets are well known. Usually such baskets consist of an open wire framework of tapered construction so that one basket may nest inside another. Where baskets with vertical sides are needed, it is the custom to provide some form of catches that may be manipulated so that one basket may be stacked on another and so that the catches may be moved out of the way when the baskets are to be nested.

Another form of basket utilizes upper and lower frameworks held in spaced parallel relationship by side frames which are tapered inwardly from the top of the bottom so that the basket will be received nestingly inside a similar basket. Usually such baskets are of rectangular form so that the baskets will nest and so that the baskets may be stacked when one basket is rotated 90° to place the long dimension of the rectangular form at right angles to the short dimension of the rectangular form of the basket immediately below.

In the handling of square articles, as for example, milk cartons or containers, it is desirable to have a basket of square construction that may be moved onto a conveyor without any need for orienting the basket and, at the same time that may be either nested or stacked in a similar basket. Up to the present time, this has not been accomplished in square baskets without the use of auxiliary catches and it has been customary to form the basket in rectangular form to accomplish both the nesting and stacking features.

The essence of my invention is to provide a square carrier basket of open frame construction having vertical sides and that may be nested in a basket of similar construction or that may be stacked on a basket of similar construction by rotating one basket 90° with respect to the other.

In drawings illustrating a preferred embodiment:

FIGURE 3 is a perspective view showing one basket stacked on another basket.

FIGURE 4 is a perspective view with the basket tipped on one side to illustrate the lower frame.

Figure 1:
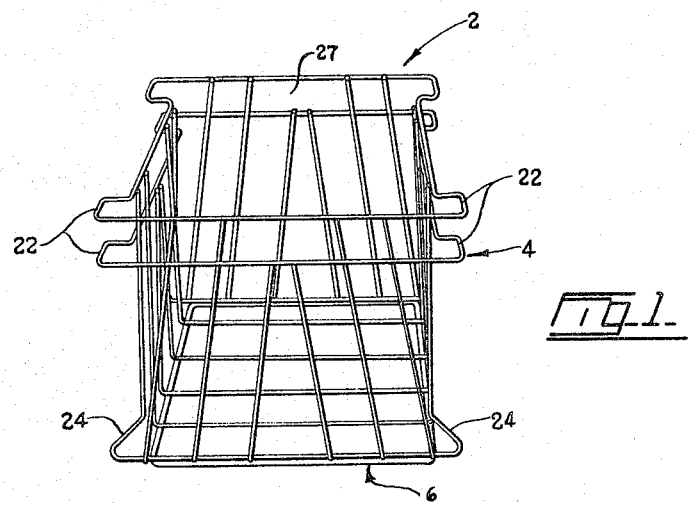
FIGURE 1 is a perspective view illustrating a basket in preferred form.

As seen in the drawings my improved carrier basket consists of a square upper framework indicated generally at 2, a square intermediate framework indicated generally at 4 and of the same size as the upper framework 2, and a square lower framework indicated generally at 6. It should be noted that the lower framework 6 is slightly smaller in size than the frameworks 2 and 4 and may be slid or nested into the frameworks 2 and 4. The frameworks 2, 4 and 6 are held in spaced parallel relationship by vertical sides which are secured to the frameworks by welding or other similar means. The sides are formed of a plurality of bars which taper inwardly from the lower frame 6 toward the centre of each side of the framework.

On two sides of the framework indicated generally at 8 and 10 the bars 12 extend from the upper frame 2 to the lower frame 6 while on the other two sides of the framework indicated generally at 14 and 16, the bars 18 forming the sides are the leg portions of U-shaped members whose crosswise portions 20 form the bottom of the carrier.

The upper and intermediate frames 4 are each formed at their corners with open ears 22 which project in opposite directions from the carrier and the corner bars 18A of the sides formed from the bars 18 are in turn formed with ears 24 adjacent the lower frame 6 and positioned immediately below and in line with the aligned ears 22 of the upper frames 2 and 4.

The bars 12 forming the sides 8 and 10 are stepped as indicated at 25 and 26 while the bars forming the sides 14 and 16 are stepped at 26 to overcome any tendency for the carriers to wedge together when nested.

The centre bars in each side are terminated at the framework 4 to provide a hand opening 27 when the carrier is lifted.

Figure 2:
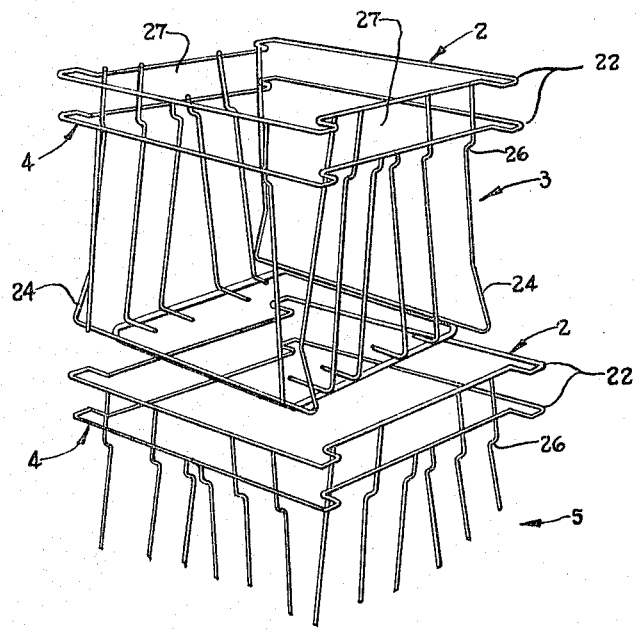
FIGURE 2 is a perspective view showing one basket immediately above a similar basket and immediately prior to nesting the upper basket in the lower.

Reference now to FIGURE 2 in the drawings will illustrate the nesting of the carriers. Here an upper carrier indicated generally at 3 is to be nested in a lower carrier indicated generally at 5 and it will be seen that the carriers are oriented so that the ears 24 on the upper carrier 3 will pass through the aligned open ears 22 on the lower carrier 5. This will allow the upper carrier 3 to be nested into the carrier 5 with the inwardly tapered side members 12 and 18 engaging their corresponding members 12 and 18 on the lower basket, and with penetration of the upper basket 3 into the lower basket 5 limited by the intermediate upper frame 4 which rests on the frame 2 of the lower basket.

Reference to FIGURE 3 of the drawings will illustrate stacking of the baskets and it will be seen that the upper basket 3 has been rotated 90° with respect to the lower basket 5 so that the projecting ears 24 will engage over the upper frame 2 of the lower basket and the upper basket will be supported on the lower.

What I claim as my invention is:

1. In a nesting carrier basket construction having substantially square spaced upper and lower substantially parallel frames interconnected by side frames substantially at right angles to the upper and lower frames and with the side frames consisting of a plurality of spaced parallel segments tapering inwardly from the bottom frame to the top frame whereby one basket may be nestingly received within a similar basket, the improvement which comprises forming the upper frame at its corners into open ears projecting in opposite directions on two sides of the basket and forming segments of the side frames adjacent the lower frame into ears projecting on opposite sides of the basket and located immediately below the said ears in the upper frame whereby the ears formed in the segments of the side frame will be received in the ears of the upper frame of a similar basket when the baskets are nested and whereby the ears formed in the segments of the side frame will engage on the upper frame to stack the baskets when one basket is rotated 90° with respect to the other.

2. The carrier basket as claimed in claim 1 wherein the spaced parallel segments of the side frames of the basket are stepped to preclude wedging of the basket in another when nested.

3. The basket as claimed in claims 1 and 2 wherein the centre segments of the side frames are opened to provided hand gripping spaces.

References Cited by the Examiner

UNITED STATES PATENTS

| | | | |
|---|---|---|---|
| 2,838,198 | 6/1958 | Vidal | 220—97 X |
| 2,964,211 | 12/1960 | Pfeffer | 220—19 |
| 2,980,282 | 4/1961 | Young | 220—19 |
| 3,037,659 | 6/1962 | Federick | 220—97 X |
| 3,160,308 | 12/1964 | Hare | 220—19 |

THERON E. CONDON, *Primary Examiner.*

G. E. LOWRANCE, *Assistant Examiner.*